(12) United States Patent
Omi

(10) Patent No.: US 6,658,754 B2
(45) Date of Patent: Dec. 9, 2003

(54) SLIDING MECHANISM OF ENCODER AND MANUFACTURING METHOD THEREOF

(75) Inventor: Toshihiro Omi, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/184,287

(22) Filed: Jun. 27, 2002

(65) Prior Publication Data

US 2003/0005595 A1 Jan. 9, 2003

(30) Foreign Application Priority Data

Jun. 27, 2001 (JP) .......................... 2001-195155

(51) Int. Cl.[7] .............................................. G01B 21/16
(52) U.S. Cl. .......................................... 33/706; 33/708
(58) Field of Search ........................... 33/706, 707, 708

(56) References Cited

U.S. PATENT DOCUMENTS

| | | | | | |
|---|---|---|---|---|---|
| 5,172,485 | A | * | 12/1992 | Gerhard et al. ................ | 33/706 |
| 6,098,295 | A | * | 8/2000 | Feichtinger .................. | 33/1 PT |
| 6,105,271 | A | * | 8/2000 | Freitag et al. ................. | 33/706 |
| 6,108,925 | A | * | 8/2000 | Freitag ......................... | 33/706 |
| 6,272,766 | B1 | * | 8/2001 | Tondorf et al. ............... | 33/809 |
| 6,327,791 | B1 | * | 12/2001 | Norcross et al. .............. | 33/706 |
| 6,442,861 | B1 | * | 9/2002 | Boge et al. .................... | 33/706 |
| 6,571,486 | B1 | * | 6/2003 | Tondorf et al. ............... | 33/706 |

* cited by examiner

Primary Examiner—Christopher W. Fulton
(74) Attorney, Agent, or Firm—Rankin, Hill, Porter & Clark LLP

(57) ABSTRACT

A scale and index scale are respectively provided with a sliding rail and sliding film. The sliding rail and sliding film are formed by means of compound plating in which a self lubricating substance such as PTFE resin powder is dispersed.

10 Claims, 2 Drawing Sheets

SLIDING MECHANISM OF ENCODER AND MANUFACTURING METHOD THEREOF

BACKGROUND OF THE INVENTION

1. Field of the Invention

The present invention relates to a sliding mechanism of an encoder and a manufacturing method thereof for detecting a displacement between two objects which are arranged so that they can be moved relative to each other.

2. Description of the Related Art

Concerning the encoder, there are provided various types of encoders such as a photoelectric type encoder, electrostatic capacity type encoder and magnetic type encoder. In any type encoder, it is necessary to form a predetermined gap for preventing abrasion between a scale and a detecting section which detects a displacement of the scale. In order to obtain a high intensity of signal, it is desired that this gap is reduced as minute as possible. Conventionally, as a method of forming the above minute gap, a bearing mechanism or sliding roller mechanism has been adopted.

However, in the case of a mechanical construction such as a bearing mechanism, the assembling work becomes complicated. Therefore, the mechanical construction is not appropriate for mass production. Recently, the resolution of a scale has reached a very minute order such as sub-microns. According to that, it becomes necessary to reduce the gap formed between the scale and the detecting section to less than several tens $\mu$m. It is very difficult for the mechanical construction such as a bearing mechanism to attain such a minute gap.

SUMMARY OF THE INVENTION

It is an object of the present invention to provide a sliding mechanism of an encoder and a manufacturing method thereof capable of obtaining a minute gap by a simple manufacturing process so that the sliding mechanism of an encoder can be appropriately used for mass production.

A sliding mechanism of an encoder of the present invention comprises: a scale having a predetermined reference grating is formed; a detecting section, which is arranged being opposed to the scale at a predetermined interval and can be relatively displaced with respect to the scale, for detecting a displacement distance or a displacement direction with respect to the scale; a sliding rail formed on one of the scale and the detecting section in the displacement direction of the detecting section; and a sliding plating film formed on the other of the scale and the detecting section so that the film can be contacted with the sliding rail, the sliding plating film sliding on the sliding rail when the detecting section is displaced, wherein the sliding rail and the sliding plating film are a compound plating film on which a self lubricating substance is dispersed by an electroless compound plating. In this case, it is preferable that the sliding rail is formed on the scale and the sliding plating film is formed on the detecting section. Further, it is preferable that the self lubricating substance is selected from at least one of polytetrafluoroethylene resin, silicon carbide and boron nitride.

According to the present invention, by the self lubricating property of the self lubricating substance, a friction between the sliding rail and the sliding plating film can be reduced. Therefore, the detecting section can be smoothly slid with respect to the scale. Further, the sliding rail and the sliding plating film are generated by the technique of electroless plating. Accordingly, when a plating bath time of the electroless plating is appropriately adjusted, the thickness of the sliding rail and the sliding plating film can be accurately controlled. Therefore, compared with the conventional mechanical construction such as a bearing mechanism or sliding roller mechanism, an adjustment of the minute gap between the scale and the detecting section can be very easily executed according to the construction of the present invention. Further, it becomes unnecessary to conduct maintenance work such as feeding lubricant, that is, maintenance can be made easily.

DETAILED DESCRIPTION OF THE INVENTION

Next, referring to FIGS. 1 and 2, an embodiment in which the present invention is applied to an optical type encoder will be explained below.

Figure 1:
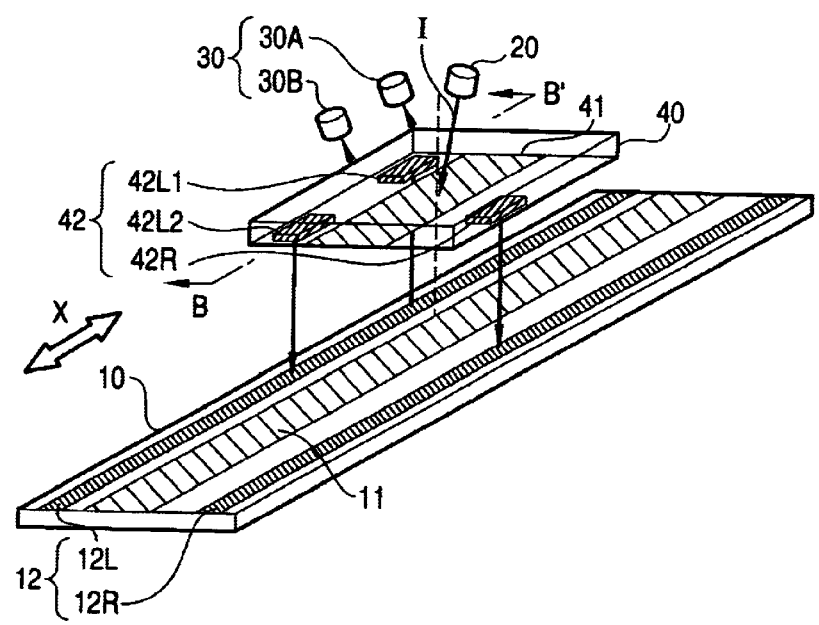
FIG. 1 is a view showing a structure of a sliding mechanism of an encoder of the present invention.
Figure 2:
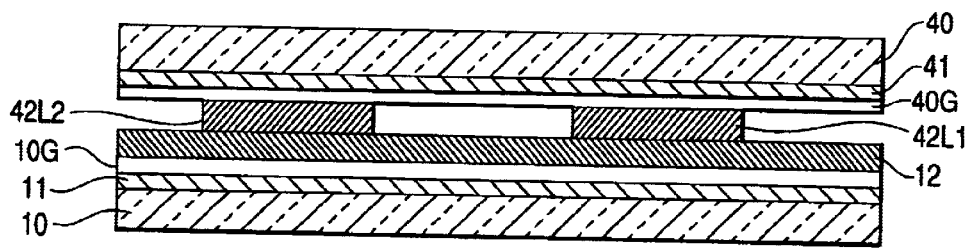
FIG. 2 is a sectional view taken on line B–B' in FIG. 1 showing the encoder.

FIG. 1 is a perspective view showing a construction of the first embodiment of the present invention, and FIG. 2 is a sectional view taken on line B–B' in FIG. 1.

As shown FIG. 1, the optical type encoder of the present invention includes a scale 10, a light source 20, a detector 30 and an index scale 40. The light source 20 projects a luminous flux to the scale 10. The light source 20 is, for example, a semiconductor laser or LED lamp. The detector 30 receives a luminous flux sent from the scale 10 and generates a detection signal. The index scale 40 is composed in such a manner that it can be moved being integrated with the light source 20 and the detector 30. The light source 20, detector 30 and index scale 40 function as a detecting section for detecting a displacement distance or displacement direction with respect to the scale 10.

The scale 10 is provided with a diffraction grating 11 which is a reference grating formed by the method of photolithography. The diffraction grating 11 is composed of a large number of gratings which are arranged at predetermined intervals extending in a direction perpendicular to a length measuring direction as shown by arrow X in the drawing. As shown in FIG. 2, on this diffraction grating 11, there is provided a protective film 10G for protecting the diffraction grating 11 from abrasion and corrosion. In this connection, the protective film 10G is omitted in FIG. 1. Further, on this protective film 10G, there is provided a sliding rail 12 extending in the length measuring direction X. The sliding rail 12 is provided so that the index scale 40 can be slid and moved on the sliding rail 12. For example, as shown in FIG. 1, the sliding rail 12 has two belt-shaped sliding rails 12R, 12L which are formed interposing the diffraction grating 11. These sliding rails 12R, 12L are composed of a compound plating layer which is made in such a manner that powder of polytetrafluoroethylene resin (PTFE resin) having a self lubricating property is dispersed on an electroless plating nickel layer. Instead of PTFE resin, the other self lubricating substance such as silicon carbide (SiC) or boron nitride (BN) may be used.

On the lower face of the index scale 40, that is, on the side of the index scale 40 opposed to the scale 10, there is provided a diffraction grating 41 formed by the method of photolithography. In the same manner as that of the diffraction grating 11, the diffraction grating 41 is composed of a large number of gratings which are arranged at predetermined intervals and extended in a direction perpendicular to the length measuring direction X. The diffraction grating 41 functions as a light emitting side grating by which the luminous flux I emergent from the light source 20 is transmitted or diffracted in a predetermined direction so that the luminous flux I can be incident upon the diffraction grating 11. The diffraction grating 41 also functions as a light receiving side grating by which the luminous flux sent from the diffraction grating 11 is transmitted or diffracted in a predetermined direction so that the luminous flux can be incident upon the detector 30. As shown in FIG. 2, on the lower face of this diffraction grating 41, there is provided a protective film 40G for protecting the diffraction grating 11 from abrasion and corrosion. In this connection, the protective film 40G is omitted in FIG. 1.

In the lower portion of this protective film 40G, there is provided a sliding film 42 which slides on the sliding rail 12 described before. For example, the sliding film 42 may be composed of pieces of the sliding films 42R, 42L1, 42L2 which are arranged so that the index scale 40 can be supported at the three points. The sliding film 42 may be formed into a belt-shape like the sliding rail 12.

In the same manner as that of the sliding rails 12R, 12L, this sliding film 42 is composed of a compound plating layer which is made in such a manner that powder of polytetrafluoroethylene resin (PTFE resin) having a self lubricating property is dispersed on an electroless plating nickel layer. Instead of PTFE resin, the other self lubricating substance such as silicon carbide (SiC) or boron nitride (BN) may be used.

In this embodiment, the sliding rail 12 is formed into a belt-shape as shown in FIG. 1. However, the sliding rail 12 is not limited to this embodiment. The sliding rail 12 may be also composed of three pieces of sliding films like the sliding films 42R, 42L1, 42L2. In this case, the sliding film 42 is preferably formed into two belt-shape sliding films which are formed interposing the diffraction grating 41.

Actually, the friction coefficient of the sliding film (sliding rail) cannot be zero even if the sliding film (sliding rail) has the good lubricating property. Therefore, the smaller the contact area between the sliding film and the sliding rail becomes, the smoother the detecting section slides with respect to the scale. Viewed in this light, it is preferable that one of the sliding film 42 and the sliding rail 12 is composed of three pieces of sliding films.

Further, the wear occurs in the sliding film (sliding rail) even if the sliding film (sliding rail) has the good wear resistance. As the sliding film slides with respect to the sliding rail while being in contact with the sliding rail, the play occurs between the detecting section and the scale when the wear occurs partially in the sliding film (sliding rail), and thus the detecting section cannot smoothly slide with respect to the scale. The play causes the micro vibration affecting the output signal of the detecting section. For such the play, the three-point contact of sliding film is the most stable seat mechanism so that the occurrence of the play is reduced. Viewed in this light, it is preferable that one of the sliding film 42 and the sliding rail 12 is composed of three pieces of sliding films.

Next, referring to FIGS. 3A to 3D, the method of manufacturing the scale 10 and the index scale 40 will be explained below while emphasis is being placed on the method of manufacturing the sliding rail 12 and the sliding film 42. In this case, the method of manufacturing the sliding rail 12 and that of manufacturing the sliding film 42 are identical with each other. Therefore, the method of manufacturing the sliding rail 12 will be explained here.

Figure 3A:
FIGS. 3A to 3D are views showing a manufacturing method of the encoder shown in FIG. 1.

The diffraction grating 11 is formed on the glass substrate 10' by the well known method of photolithography. After the surface of this diffraction grating 11 has been covered with the protective film 10G as shown in FIG. 3A, this is put into a plating solution and electroless compound plating is conducted. Powder of PTFE resin is put into the plating solution. In order to uniformly suspend powder of PTFE resin in this solution, the solution is sufficiently stirred with a pump used for blowing air. Instead of using the pump, it is possible to stir the solution by rotating a propeller in the solution.

Figure 3B:

After the scale 10 has been dipped in the solution for a predetermined time, it is taken out from the solution. The electroless nickel plating layer 12' is formed on the protective film 10G as shown in FIG. 3B. In this nickel plating layer, there is formed a dispersion layer in which eutectic PTEF resin is uniformly dispersed Concerning the particles arranged close to the surface of the plating film, some portions of the particles are embedded in the metal, and the rest portions of the particles are exposed outside.

Figure 3C:
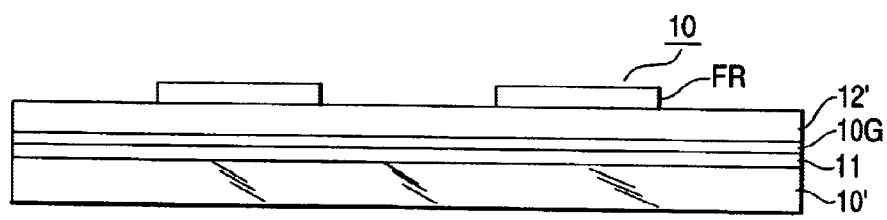
Figure 3D:
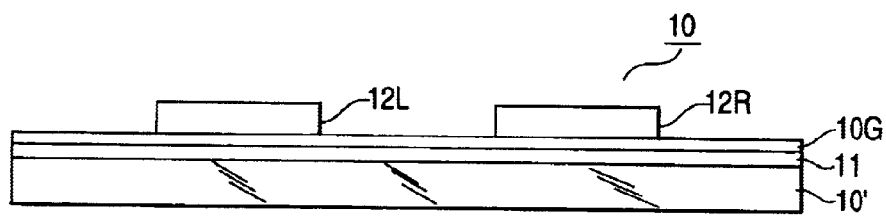

Next, resist FR is coated on the entire surface of the nickel plating layer 12', and a shape of the sliding rail layer to be formed is developed as shown in FIG. 3c and then etching is conducted. Due to the foregoing, the sliding rails 12R, 12L are formed on the scale 10 as shown in FIG. 3D. In the same manner, the sliding film 42 is also formed on the index scale 42.

Since PTFE resin has a self lubricating property, the coefficient of friction between the sliding rail 12 and the sliding film 42 is low. Therefore, the index scale 40 can move smoothly relatively with respect to the scale 10. Further, the sliding rail 12 and the sliding film 42 are made by the technique of plating. Accordingly, when the plating bath time of the plating is appropriately adjusted, the thickness of the sliding rail 12 and the sliding film 42 can be accurately controlled. Therefore, an adjustment of the minute gap between the scale and the detecting section can be very easily conducted as compared with the conventional mechanical construction such as a bearing mechanism or a sliding roller mechanism. Further, it becomes unnecessary to conduct maintenance work such as feeding lubricant, that is, maintenance can be made easily.

Explanations are made into a case of applying the present invention to an optical type encoder in which the diffraction grating is utilized. Of course, the present invention can be applied to the other type encoders, for example, a magnetic type encoder or an electrostatic capacity type encoder.

As explained above, according to the sliding mechanism of the encoder of the present invention, it is possible to provide a simple process in which a minute gap between the scale and the detecting section is formed, which can be easily used for mass production.

What is claimed is:
1. A sliding mechanism of an encoder comprising:
   a scale having a predetermined reference grating;
   a detecting section, which is arranged being opposed to the scale at a predetermined interval and can be relatively displaced with respect to the scale, for detecting a displacement distance or a displacement direction with respect to the scale;
   a sliding rail formed on one of the scale and the detecting section in the displacement direction of the detecting section; and a sliding plating film formed on the other of the scale and the detecting section so that the film can be contacted with the sliding rail, the sliding plating film sliding on the sliding rail when the detecting section is displaced, wherein the sliding rail and the sliding plating film are a compound plating film on which a self lubricating substance is dispersed by an electroless compound plating.

2. The sliding mechanism of an encoder according to claim 1, wherein the sliding rail is formed on the scale and the sliding plating film is formed on the detecting section.

3. The sliding mechanism of an encoder according to claim 2, wherein the sliding rail includes two belt-shaped sliding rails formed so that the reference grating can be interposed between them.

4. The sliding mechanism of an encoder according to claim 2, wherein the sliding film includes three sliding plating film pieces arranged so that the detecting section can be supported at three points by them.

5. The sliding mechanism of an encoder according to claim 2, wherein the scale has a protective film between the predetermined reference grating and the sliding rail.

6. The sliding mechanism of an encoder according to claim 1, wherein the self lubricating substance includes at least one of polytetrafluoroethylene resin, silicon carbide and boron nitride.

7. A method of manufacturing a sliding mechanism of an encoder having a scale with a predetermined reference grating and a detecting section for detecting a displacement distance or a displacement direction with respect to the scale, the method comprising:

forming the predetermined reference grating on a first glass substrate;

forming a first compound plating layer in which a self lubricating substance is dispersed on the predetermined reference grating by conducting an electroless compound plating onto the first glass substrate;

forming a first sliding plating layer of the scale by etching the first compound plating layer with a predetermined pattern;

forming a second compound plating layer in which a self lubricating substance is dispersed by conducting the electroless compound plating onto a second glass substrate; and forming a second sliding plating layer of the detector by etching the second compound plating layer with a predetermined pattern.

8. The method of manufacturing a sliding mechanism of an encoder according to claim 7, the first sliding plating layer is formed into two belt-shaped sliding rails formed so that the reference grating can be interposed between them, and the second sliding plating layer is formed into three sliding plating film pieces arranged so that the detecting section can be supported at three points by them.

9. The method of manufacturing a sliding mechanism of an encoder according to claim 7, further comprising:

forming a protective film between the predetermined reference grating and the first sliding plating layer.

10. The method of manufacturing a sliding mechanism of an encoder according to claim 7, further comprising:

forming a diffraction grating between the second glass substrate and the second sliding plating layer.

\* \* \* \* \*